(12) United States Patent
Mache

(10) Patent No.: US 7,213,149 B2
(45) Date of Patent: May 1, 2007

(54) MESSAGE AUTHENTICATION

(75) Inventor: Niels Mache, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 711 days.

(21) Appl. No.: 09/728,800

(22) Filed: Dec. 1, 2000

(65) Prior Publication Data

US 2001/0002929 A1 Jun. 7, 2001

(30) Foreign Application Priority Data

Dec. 2, 1999 (EP) ................................ 99 124 150

(51) Int. Cl.
*H04L 9/00* (2006.01)
(52) U.S. Cl. ..................... 713/170; 713/171; 713/178; 380/259; 380/281; 380/284; 380/283
(58) Field of Classification Search ................ 713/170, 713/178, 171; 380/259, 281, 284, 283
See application file for complete search history.

(56) References Cited

U.S. PATENT DOCUMENTS

| | | | | |
|---|---|---|---|---|
| 5,757,920 A | * | 5/1998 | Misra et al. ................. | 713/158 |
| 5,781,629 A | * | 7/1998 | Haber et al. ................. | 713/177 |
| 5,926,549 A | | 7/1999 | Pinkas | |
| 5,956,404 A | * | 9/1999 | Schneier et al. ............. | 713/180 |
| 6,189,098 B1 | * | 2/2001 | Kaliski, Jr. .................. | 713/168 |
| 6,198,824 B1 | * | 3/2001 | Shambroom ................ | 380/279 |
| 6,230,269 B1 | * | 5/2001 | Spies et al. .................. | 713/182 |
| 6,237,095 B1 | * | 5/2001 | Curry et al. ................. | 713/178 |
| 6,363,365 B1 | * | 3/2002 | Kou ............................. | 705/64 |
| 6,367,013 B1 | * | 4/2002 | Bisbee et al. ................ | 713/178 |
| 6,393,566 B1 | * | 5/2002 | Levine ......................... | 713/178 |
| 6,591,364 B1 | * | 7/2003 | Patel ............................ | 713/170 |

FOREIGN PATENT DOCUMENTS

| | | |
|---|---|---|
| EP | 0 874 300 | 10/1998 |
| WO | WO 99 57846 | 11/1999 |

OTHER PUBLICATIONS

Bellare M et al: "Keying Hash Functions for Message Authentication" Proceedings of the Annual International Cryptology Conference (Crypto), DE, Berlin, Springer, vol. Conf. 16, 1996, pp. 1-15, XP000626584.

* cited by examiner

*Primary Examiner*—Ayaz Sheikh
*Assistant Examiner*—Kaveh Abrishamkar
(74) *Attorney, Agent, or Firm*—Oblon, Spivak, McClelland, Maier & Neustadt, P.C.

(57) ABSTRACT

For the authentication of messages communicated in a distributed system from an originator to a destination a keyed-hashing technique is used according to which data to be authenticated is concatenated with a private (secret) key and then processed to the cryptographic hash function. The data are transmitted together with the digest of the hash function from the originator to the destination. The data comprises temporal validity information representing the temporal validity of the data. For example the setup key of a communication is therefore only valid within a given time interval that is dynamically defined by the communication originator. After the time interval is exceeded the setup key is invalid and cannot be reused again.

7 Claims, 3 Drawing Sheets

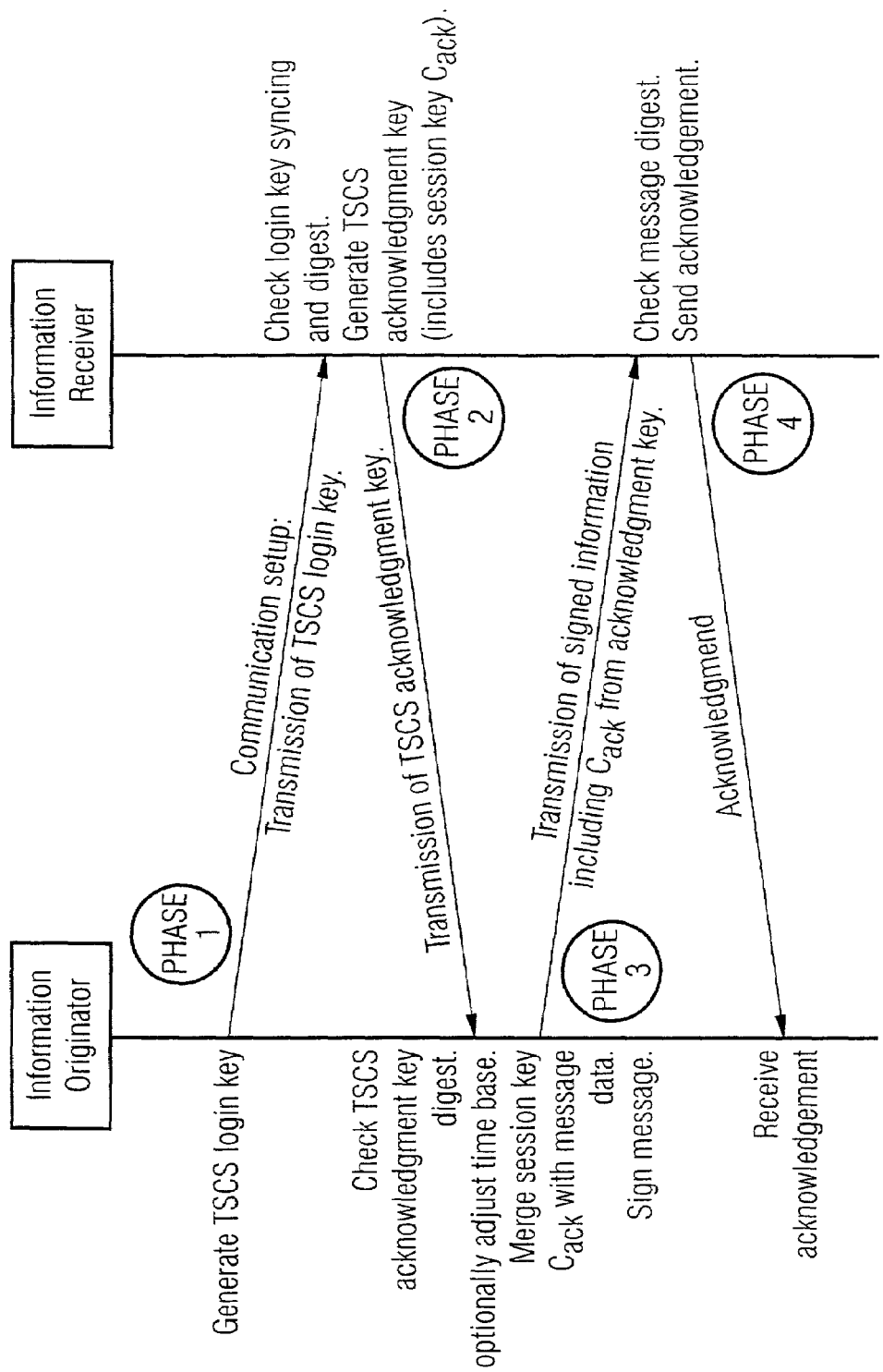

FIG 2

TSCS login key

Figure 3:
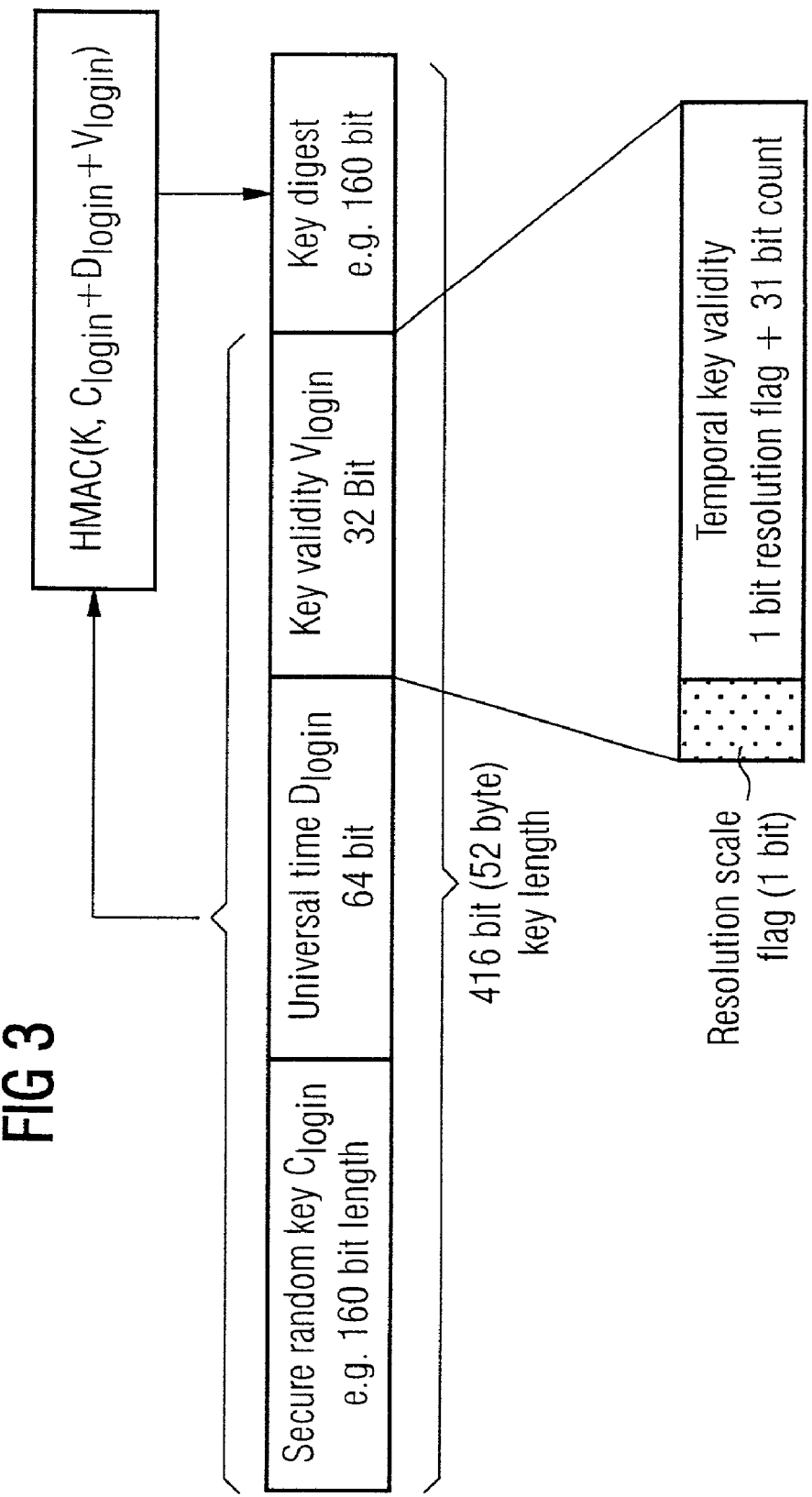

$C_{login}$: Secure random number (e.g. bit array of 160 Bit length).

$T_{login}$: System date and time as universal time (UT) with high resolution (e.g. milliseconds) but not mandatory with high accuracy.

$V_{login}$: Temporal key validity in milliseconds resp. nanoseconds (bit field with 32 bit length).

$D_{login} = HMAC(K, C_{login} + T_{login} + V_{login})$
Authentication of random key, system time and validity by keyed hashing message authentication code (HMAC) with private key K.

TSCS acknowledgement key

$C_{ack}$: Secure random number (e.g. bit array of 160 Bit length).

$T_{ack}$: System date and time as universal time (UT) (optionally).

$D_{ack} = HMAC(K, C_{ack} [+T_{ack}])$
Authentication of random key and validity by keyed-hashing message authentication code (HMAC) with private key K.

MESSAGE AUTHENTICATION

The present invention relates to a method for the authentication of data communicated from an originator to a destination, to a method for the authenticated transmission of messages, to a software program product capable of implementing such a method, to a distributed system for communicating authenticated data from an originator to a destination as well as to a distributed system for the authenticated transmission of messages.

Generally the present invention relates to the field of secure communication setup systems and methods which allow the secure communication setup between two communication parties, an originator and a destination. In an authenticated (but not secret) two party communication setup the communication partners and the messages exchange must be authenticated meaning that the communicating parties can verify that the received messages have not been altered as well as that the sender and receiver are authentic.

Generally there are the following four important aspects of secure communication setup between two communicating parties:

Assurance that the originating communication partner is authorised to establish the connection (source is authentic),
assurance that the receiving communication partner is authorised (destination is authentic),
assurance that the received message was sent by the originating communication partner, and
assurance that the sent and received message has not been altered.

From the state of the art it is known to use keyed-hashing message authentication techniques. General background information on message authentication codes (MAC) and cryptographic (one-way) hashing can be found for example in Schneyer, Bruce "Applied Cryptography", Edison-Wessley 1996.

Keyed-hashing for message authentication (HMAC) is a mechanism for message authentication using cryptographic hash functions. HMAC can be used with any iterative cryptographic hash function, e.g. MD5, SH-1 in combination with a secret (private) shared key. The cryptographic strength of HMAC depends on the properties of the underlying hash function. HMAC uses a secret key for calculation and verification of the message authentication values.

Further information on HMAC can be found for example in Bellare et al "Keying hash functions for message authentication", Proceedings of Crpyto-96, LNCS 1109, pages 1 to 15.

The very first and initial communication step in communication setup (e.g. the login procedure) is susceptible to copy or replay attacks which send a copy of communication setup (e.g. a user name and password recorded from a login procedure) to the communication partner. This problem is usually solved with additional knowledge about the communication partner at the other side and/or using large random session keys or transaction keys (usually taken from a transaction hearing).

It is the object of the present invention to provide for a technique reducing the risk of copy or replay attacks particularly in the first step of a communication setup in a more efficient way.

This object is achieved by means of the features of the independent claims. The dependent claims develop further the central idea of the invention.

According to the present invention, a method for the authentication of data communicated from an originator to a destination is provided. A keyed-hashing technique is used according to which data to be authenticated is concatenated with a private key and then processed with a cryptographic hash function. The data are then transmitted together with the digest of the hash function form the originator to the destination. The data comprise temporal validity information representing the limited temporal validity of the data.

The temporal validity information can be defined by the originator.

The data can comprise random data which are unique for a time span defined by the temporal validity information.

The data can be a login key for a communication setup and/or a message.

According to another aspect of the present invention a method for the authenticated transmission of messages is provided. A login key is at first generated by a keyed-hashing method on the basis of random data, temporal validity information and a private key. The login key is transmitted from an originator to a destination. The authenticity and the temporal validity of the login key is verified on the basis of the keyed-hashing digest on the destination side.

In case the verification of the authenticity and the temporal validity of the login key is positive, further acknowledgement steps can be effected. An acknowledgement key can be generated by a keyed-hashing method on the basis of second random data and the private key. The acknowledgement key is transmitted from the destination to the originator. The acknowledgement key is then verified by the originator.

The acknowledgement key can furthermore comprise a time stamp and when verifying the acknowledgement key it can be checked on the basis of the time stamp and the temporal validity information whether the acknowledgement key is still valid.

The method can furthermore comprise message transmission steps in case the verification of the acknowledgement key is positive. The second random data of the acknowledgement key are extracted. A message is generated by a key hashing method on the basis of the second random data, message data and the private key. The message is then transmitted from the originator to the destination and the message is verified by the destination.

The message can furthermore comprise a time stamp and when verifying the message it is checked on the basis of the time stamp and the temporal validity information whether the message is still valid.

According to a still other aspect of the present invention a software program product is provided implementing, when loaded into a computing device of a distributed system, a method according to anyone of the preceding claims.

According to a still other aspect of the present invention a distributed system for communicating authenticated data from an originator to a destination is provided. The system is designed for a keyed-hashing technique according to which data to be authenticated is concatenated with a private key and then processed with a cryptographic (one-way) hash function. The data are then transmitted together with the digest of the hash function from the originator to the destination. The data thereby comprised temporal validity information representing the temporal validity of the data.

The originator can be designed to define the temporal (limited) validity information.

The data can comprise random data which are unique for a time span defined by the temporal validity information.

The data can be a login key for a communication setup and/or a message.

According to a still other aspect of the present invention a distributed system for the authenticated transmission of messages is provided. The distributed system comprises an originator designed to generate a login key by a keyed-hashing method on the basis of random data, temporal validity information and a private key. Furthermore, a network for transmitting the login key from the originator to a destination is provided. The destination is designed to verify the authenticity and the temporal validity of the login key on the basis of the keyed-hashing digest.

The destination can be designed to generate an acknowledgement key by a keyed-hashing method on the basis of second random data and the private key and to transmit the acknowledgement key to the originator in case the verification of the authenticity and the temporal validity of the login key is positive. The originator is designed to verify the acknowledgement key.

The acknowledgement key can furthermore comprise a time stamp and when verifying the acknowledgement key the originator checks on the basis of the time stamp and the temporal validity information whether the acknowledgement key is still valid.

The originator can be designed to extract the second random data from the acknowledgement key in case the verification of the acknowledgement key is positive, to generate the message by a keyed-hashing method on the basis of the second random data, message data and the private key and to transmit the message to the destination. The destination is designed to verify the message.

The message can furthermore comprise time stamp and when verifying the message, the destination checks on the basis of the time stamp and the temporal validity information whether the message is (still) valid.

Further features, advantages and objects of the present invention will become evident for the man skilled in the art when reading the following description of an embodiment taken in conjunction with the figures of the enclosed drawings.

FIG. 1 shows hand shake and information flow between two communication partners with a time synchronised communication setup by keyed-hashing message authentication (TSCS), FIG. 2 shows the TSCS login key and acknowledgement key, and FIG. 3 shows the internal structure of a TSCS login key.

According to the time synchronised communication setup by keyed-hashing message authentication (TSCS) almost all setup keys are unique by using a secure random number generator. The setup key is only valid within a given time interval that is dynamically defined by the communication originator. The information sender and receiver authenticate each other. Only if both partners are authenticated, the information will be accepted by the communication partner. After the time interval is exceeded the setup key is invalid and cannot be reused again. Within the time interval the setup key can be reused. This feature is realised without storing of login keys.

The communication partners share only a single private (secret) key (of arbitrary length) which can be exchanged periodically using known secure protocols (e.g. a public key encryption method). The TSCS communication setup protocol is inherently robust against copy or replay attacks. As mentioned above, TSCS relies on the keyed-hashing for message authentication code (HMAC). It is known from the prior art that HMAC is hard to break even if the underlying secure hash function (e.g. SHA-1 or MD-5) has some weakness such as predictable collisions.

FIG. 1 shows handshake and information flow between two communicating partners with the Time Synchronized Communication Setup by Keyed-Hashing Message Authentication (TSCS).

In phase 1 the information originator generates a TSCS login key and sends the login key to the receiver. As shown below a TSCS login key consists of a (secure) random bit array, a unified system time, a temporal validity field and its authentication key. If the random bit array is large the chance of generation of generating two identical random arrays is very small. The receiver receives the login key and checks its authentication key. Because of the originator and the receiver share the same private key, the login keys digest differs if the login key has been altered (in this case further communication is denied). If the key is valid, the receiver checks its temporal validity as described in the validity field.

In phase 2 the receiver generates a TSCS acknowledgement key and sends it to the receiver. The acknowledgement key consists of a new random bit array (independent from the originator) and the unified system time of the receiver.

In phase 3 the originator checks the acknowledgement key (i.e. the digest and temporal validity), takes the random bit field of the acknowledgement key and merges it with the message data which is intended to be sent. The data (consisting of the message and the random field) is signed and sent to the receiver.

Then the receiver checks in phase 4 the message digest and the identity of random bit field (from the message) and the previously generated random bit array of the acknowledgement key. If the message digest is valid and the bit arrays are identical, the message has not been altered AND was generated as a result of the previous exchange of login and acknowledgement keys. The receiver sends then an acknowledgement to the communication originator.

FIG. 2 shows the TSCS login and acknowledgement key. The login key is created and signed by the communication originator. The acknowledgement key is returned and signed by the receiver. The transmitted signature is not necessarily the complete keyed-hashing message authentication code (HMAC) with its full digest length. For the login and acknowledgement keys it may be meaningful for security and key length to compress the digest to limit its length.

FIG. 3 shows the internal structure of a TSCS login key. The HMAC key digest may be compressed to reduce key length and to prevent the private key K from key break attacks if the signed message is short (here 265 bit). A compression to 80 bit digest length (by a state machine) is appreciated for short message lengths.

The handshake between the two communicating parties consists of four phases. In the following the procedure according to the present invention will be explained in detail.

Phase 1:

Communication Originator Login
a) Generate a TSCS login key
  b) generate of a secure random bit array
  c) append the unified time (UT) field
  d) append the temporal validity field
  e) generate the Keyed-Hashing Message Authentication Code (HMAC) using private key K
  f) append the HMAC (or a subset of) to the login key
  g) transmit the login key to the receiver, Phase 2:

Receiver Acknowledgement
a) [OPTION 1] search the key table for a key that is identical to the current login key random bit field
b) [OPTION 1] if a duplicated key was found in the key table, terminate connection and exit.
c) [OPTION 1] store the random bit array of the login key in the key table until key expires
d) verification of the login key authenticity and validity
e) check the login key signature (the digest)
f) calculate own HMAC using private key K
g) compare own HMAC with login key digest
h) check the login key temporal validity
i) calculate the difference between login key universal time and current time (of the receiver).
j) check if time difference (the absolute value) is less then the temporal validity of the login key
k) generate the acknowledgement key
l) generate secure random bit array (the session key)
m) store session key
n) append the unified time (UT) field
o) generate the Keyed-Hashing Message Authentication Code (HMAC) using private key K
p) append the HMAC (or a subset of) to the acknowledgement key
q) transmit acknowledgement key to communication originator Phase 3:

Message Transmission
a) verification of the acknowledgement key authenticity and validity
b) check the acknowledgement key signature (the digest)
c) calculate own HMAC using private key K
d) compare own HMAC with acknowledgement key digest
e) check the acknowledgement key temporal validity
f) calculate the difference between acknowledgement key universal time and current time (of the originator).
g) check if time difference (absolute value) is less then the temporal validity of the acknowledgement key
h) extract the random bit field from acknowledgement key
i) append or merge the random field (the session key) with the message data
j) [OPTION 2] append universal time (of the originator) to the message
k) sign the message data and session key (and optionally universal time), i.e. calculate HMAC of message data and session key using private key K
l) append HMAC (or a subset of) to the message data and session key
m) transmit the message, i.e. transmit the message data, session key and HMAC to the receiver Phase 4:

Message Verification
a) verification of the message authenticity (and optionally validity)
b) compare the session key of the message with the previously stored session key
c) check the message signature (the digest)
d) calculate own HMAC using private key K
e) compare own HMAC with message digest
f) [OPTION 2] check the message temporal validity
g) [OPTION 2] calculate the difference between message universal time and current time (of the receiver) (optionally)
h) [OPTION 2] check if time difference (absolute value) is less then the temporal validity of the acknowledgement key (optionally)
i) return an acknowledgement to the communication originator OPTION 1 is designed to eliminate so-called reply attacks (multiple use of the TSCS login key) even if the time span according to the appended temporal validity field is not yet expired. Note that said time span can be user defined between some nanoseconds and some minutes. Particularly in an Internet environment the time span will be chosen to be very long, wherein in direct connected networks it will be chosen to be quite short.

OPTION 2 gives the possibility to define a further time span for the temporal validity of the message itself.

As explained the invention relates to authenticated transmission of messages in distributed messaging and (multimedia) telecommunication systems. Time synchronized message and communication authentication can be also applied to a common message based communication between two communication partners. With minimal extension the TSCS can be also applied to 1-to-N communication like broadcast. The present invention relates to message oriented communication. Logically, message oriented communication means here that in an initial step the communication is established, then the message is send and in a third step an (optional) acknowledgement is returned by the receiving party. Message oriented communication is not effective for applications that require continuous (uni- or bi-directional) data transmission such as in real-time voice or video transmissions.

A technique for realizing secure authentication of communication setup and message transmission between two communicating parties is described. Time Synchronized Communication Setup by Keyed-Hashing Message Authentication (TSCS) provides the ability of Authentication of communicating partners.
Authentication of transmitted information.
Communicating partners share only a single private key that can be periodically changed (between the partners) by using state-of-the-art public key encryption for key transmission.
Limited temporal validity (from nanoseconds to days) of session keys that enhances communication security and limits the chance and the effects of copy or replay attacks,
Unsolicited message data sent from replay attacks will be (almost) detected,
When secure random keys are stored during their time of validity (from nanoseconds to days), replay attacks during the initial communication setup phase (which does not harm message integrity) are (almost) impossible,
Formerly exchanged session keys can (almost) never be reused again after a defined time interval (defined by the communication originator). This key property is realized without the storage of session keys.
Limitation (inherent in the apparatus) of the temporal validity of transmitted information.

The invention claimed is:
1. A method for the authenticated transmission of messages, comprising the following communication setup steps:

generating a login key by a keyed-hashing method on the basis of random data, temporal validity information, and a private key;
transmitting the login key from an originator to a destination; and
verifying the authenticity and the temporal validity of the login key on the basis of the keyed hashing digest on the destination side; and
comprising the following acknowledgement steps:
generating an acknowledgement by a keyed-hashing method on the basis of second random data and the private key, wherein the acknowledgement key includes a time stamp;
transmitting the acknowledgement key from the destination to the originator; and
verifying the acknowledgement key by the originator, including checking the acknowledgement key on the basis of the time stamp and the previously stored temporal validity information whether the acknowledgement key is still valid,
wherein the keyed-hashing technique uses random data that is stored by the destination in a table during the temporal validity of the login key.

2. The method according to claim 1, further comprising the following message transmission steps:
in case the verification of the acknowledgment key is positive,
extracting the second random data from the acknowledgment key,
generating a message by a keyed-hashing method on the basis of the second random data, message data, and the private key,
transmitting the message from the originator to the destination, and
verifying the message by the destination.

3. The method according to claim 2, wherein
the message comprises a time stamp, and
the step of verifying the message includes checking on the time stamp of the message and the temporal validity information to determine whether the message is still valid.

4. A storage medium storing a software program product, the software program product implements, when loaded into a computing device of a distributed system, the method according to claim 1.

5. The distributed system for the authenticated transmission of messages, comprising:
an originator designed to generate a login key by a keyed-hashing method on the basis of random data, temporal validity information and a private key, wherein the login key includes a key hashing digest; and
a network for transmitting the login key from the originator to a destination, wherein the destination is designed to verify the authenticity and the temporal validity of the login key on the basis of the keyed hashing digest;
wherein the destination is designed to generate an acknowledgement key by a keyed-hashing method on the basis of second random data and the private key and to transmit the acknowledgement key to the originator and the acknowledgement key includes a time stamp;
the originator is designed to verify the acknowledgement key, including checking on the basis of the time stamp and the previously stored temporal validity information whether the acknowledgement key is still valid; and
the keyed hashing technique uses random data that is stored by the destination in a table during the temporal validity of the login key.

6. The distributed system according to claim 1, wherein
the originator is configured to extract the second random data from the acknowledgment key in case the verification of the acknowledgment key is positive, generate a message by a keyed-hashing method on the basis of the second random data, message data and the private key, and transmit the message to the destination, and
the destination is configured to verify the message.

7. A distributed system according to claim 6, wherein
the message comprises a time stamp, and
the destination checks, when verifying the message, on the time stamp of the message and the temporal validity information to determine whether the message is still valid.

* * * * *